Oct. 5, 1965 T. H. CAPE 3,209,432
METHOD FOR FABRICATING A STRUCTURAL MEMBER
Filed Dec. 23, 1963 2 Sheets-Sheet 2
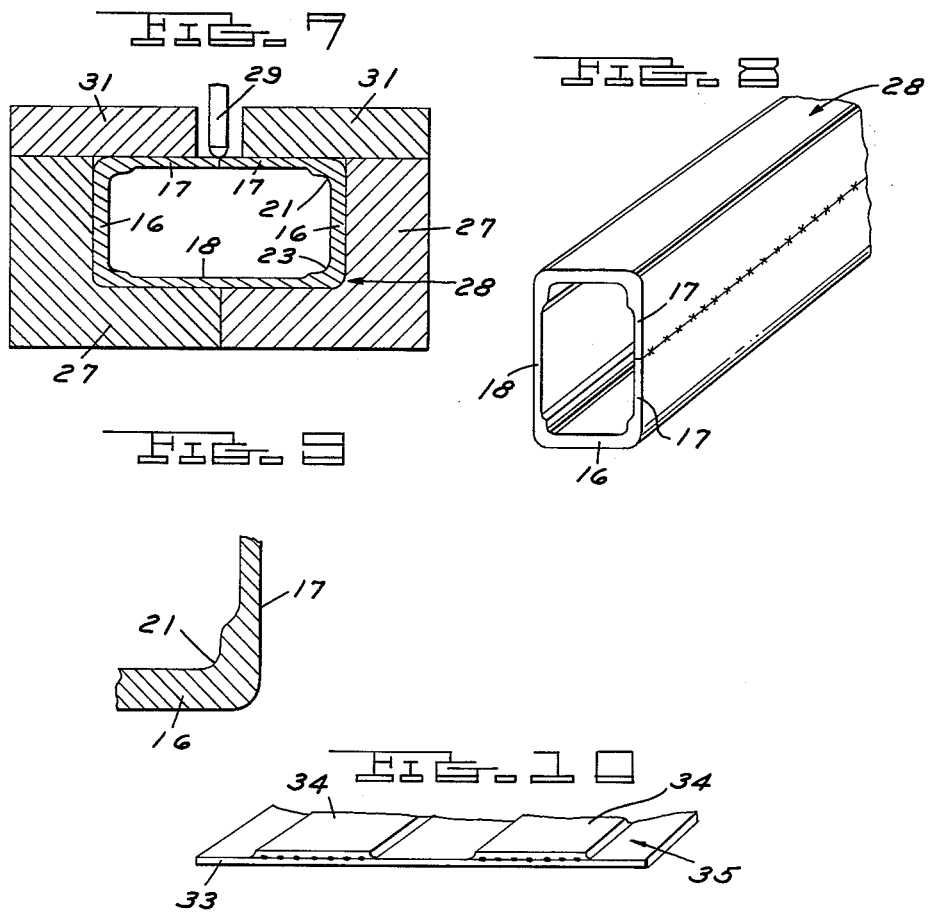
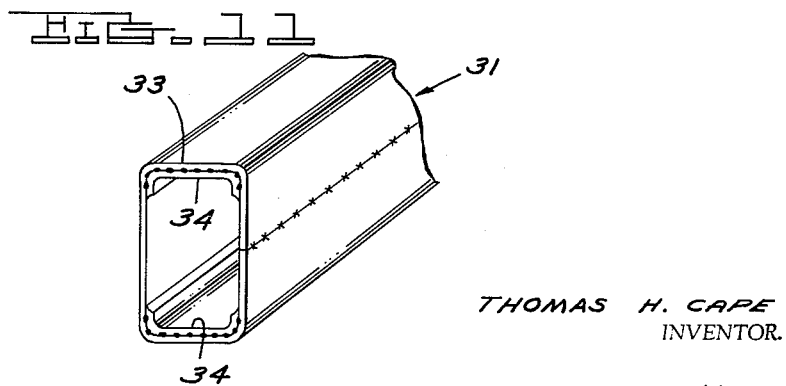
THOMAS H. CAPE
INVENTOR.
BY J. R. Faulkner
J. D. Beck
ATTORNEYS United States Patent Office 3,209,432
Patented Oct. 5, 1965

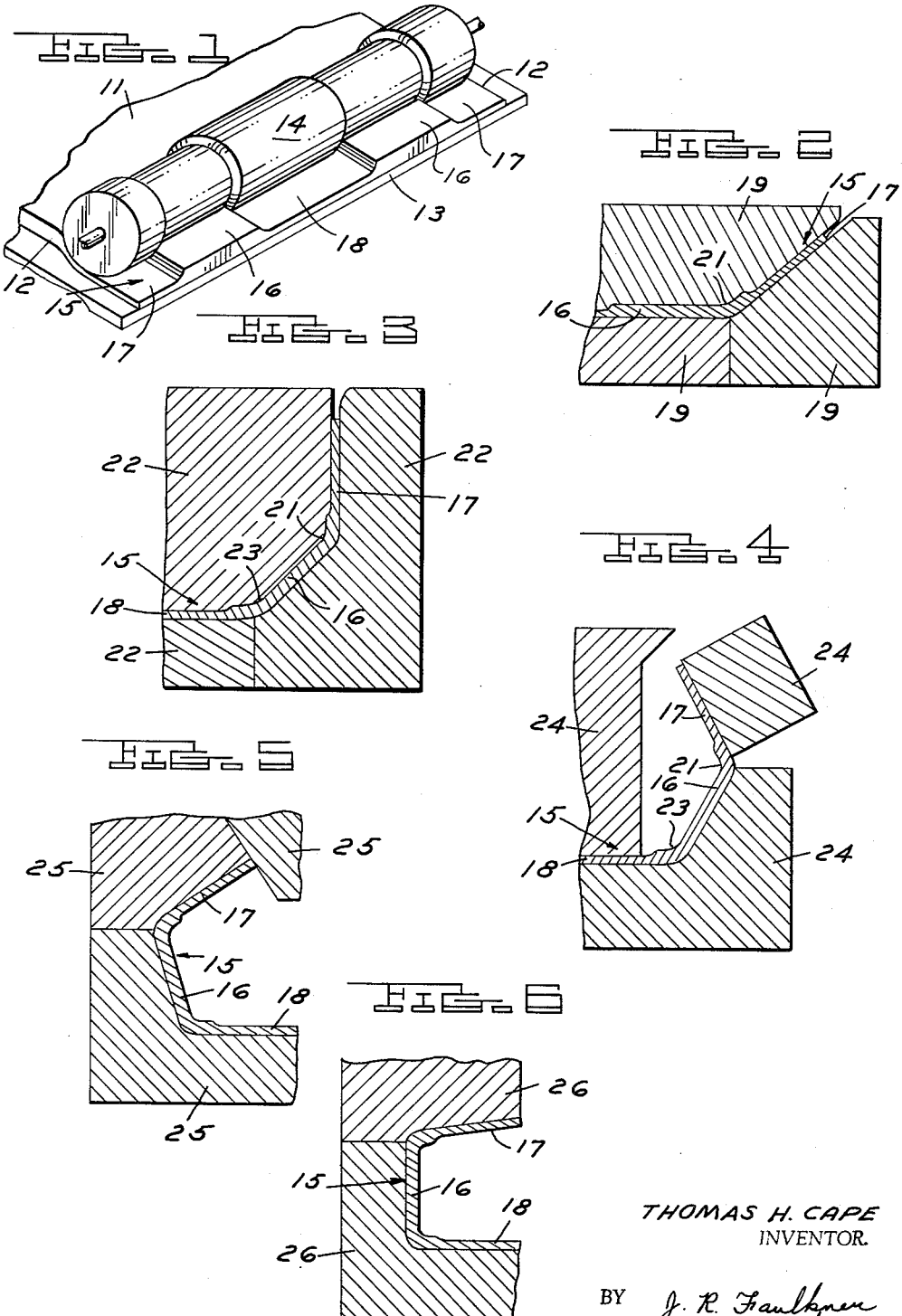

3,209,432
METHOD FOR FABRICATING A STRUCTURAL MEMBER
Thomas H. Cape, Plymouth, Mich., assignor to Ford Motor Company, Dearborn, Mich., a corporation of Delaware
Filed Dec. 23, 1963, Ser. No. 332,787
2 Claims. (Cl. 29—155)

This invention relates to a process of manufacturing structural members from a continuous strip metal stock and more particularly to a method of fabricating automobile side rails that have a variable wall thickness.

Known conventional processes for manufacturing structural members of uniform or varying wall thicknesses include rolling and extrusion. The rolling method does not readily permit the varying of the wall thickness of structural members having certain configurations, such as tubular members, for instance. The extrusion process for shaping members is relatively expensive especially when applied to the forming of steel shapes. As a result, extrusion has been limited to the shaping of structural shapes of samll sizes or to structural members formed from a metal having a relatively "soft" metallurgical composition.

The method of this invention overcomes these disadvantages as it can be readily applied to the fabrication of structural members of various configurations without undue limitations as to size, shape, and composition.

A structural member fabricated by the method of this invention is formed from a flat metal strip stock which is first worked to provide longitudinally extending portions thereon of a thickness greater than the remaining portions of the stock. Then this strip metal stock of variable thickness is progressively bent to form a structural member of the desired configuration.

This method may be effectively applied in the automotive industry to the fabrication of side rails for vehicle frames. Side rails are of a tubular construction usually having a rectangular-shaped cross section. The thickness of the walls of each side rail are constant throughout as conventional side rails are formed from flat strip metal stock of uniform gauge that is progressively bent into a rectangular cross sectional shape and then welded along the seam.

The gauge for the strip metal stock to be fabricated into side rails is selected to provide the wall thickness required to resist deflection and torsional stresses that a side rail, when assembled into a vehicle frame, may be subjected to during the life of a motor vehicle.

The side rails form the longitudinally extending members of the vehicle frame and are usually interconnected by a plurality of cross members. Upon assembly as part of the frame, the hollow rectangular-shaped side rails are positioned so that the longer wall sections of the rectangle are disposed in a vertical plane. After the frame becomes a component part of the vehicle chassis, the horizontally extending wall sections of each side rail are subjected to severe deflection especially during extreme jounce of one of the road wheels. For this reason, these wall sections have to be of a thickness sufficient to resist the anticipated deflection stresses. The vertically disposed wall section of the side rails are subjected mostly to torsional stresses. As the deflection is more severe than the torsional stresses, it is advantageous to design the horizontally extending wall sections of the side rails of a heavier gauge than the vertically disposed wall sections.

As side rails are formed from stock of uniform gauge by present conventional methods, it has been necessary to specify a thickness for the entire stock sufficient to resist the deflection that may be encountered by the horizontally extending wall sections of the frame side rail. This has resulted in providing extra metal in those wall regions of the side rail where it is not required from a structural standpoint. Thus, the weight of the vehicle frame is substantially increased without obtaining any engineering benefits therefrom.

In a preferred embodiment, the method of this invention permits the fabrication of tubular automobile side rails from a flat strip metal stock having longitudinally extending marginal edges. The stock is rolled so as to form on one surface thereof two longitudinally extending portions of a thickness heavier than the remaining portions to define a sheet having alternating heavy and thin wall portions. The heavier portions are spaced from each other and from the longitudinal marginal edges. Preferably, the heavier portions are to be of a width greater than the horizontally extending wall sections of a completed tubular side rail. The sheet is then progressively bent into a side rail until the longitudinally extending marginal edges are in abutment with each other and with the other surface of the sheet defining the exterior surfaces of the bent side rail. The abutting edges are then continuously seam welded. The welded side rail is then cut into sections of predetermined lengths for use in automobile frame construction.

Side rails fabricated by the method of this invention have their horizontally extending wall sections of a substantially heavier gauge than the vertically disposed wall sections. Further, the inside corners of the bent side rail will lie in the heavier portions of the sheet. This will provide the required structural strength in those wall sections of the side rail which are subjected to deflection. Further, the total weight of the side rail is reduced by approximately 25 percent as only one pair of opposed walls are of a relatively heavy thickness.

Accordingly, it is an object of this invention to provide a novel, low-cost method of fabricating structural members of lighter weight than conventional structural members but without sacrificing structural strength.

A further object of this invention is to fabricate a structural member which has a heavy wall thickness in those regions of stress concentration.

Other objects and advantages of this invention will become more apparent when the following description is considered in connection with the accompanying drawings in which:

FIGURE 1 is a perspective schematic view of a portion of a flat strip metal stock which is being shaped by rolls into a sheet having alternating, longitudinally extending portions of a thickness greater than the remaining portions of the sheet to illustrate the first step of the method of this invention;

FIGURE 2 is a cross sectional view of approximately one-half of the sheet shown in FIGURE 1, partially bent into shape by bending rolls;

FIGURE 3 is a cross sectional view of approximately one-half portion of the sheet of FIGURE 2 depicting a further phase of the bending operation;

FIGURE 4 is a cross sectional view of a portion of the sheet shown in FIGURE 3 illustrating another phase of the bending operation;

FIGURE 5 is a cross sectional view of approximately the other one-half portion of the sheet depicting a further phase of the progressive bending operation;

FIGURE 6 is a cross sectional view of the portion of the sheet of FIGURE 5 depicting a still further phase of the progressive bending operation;

FIGURE 7 is a cross sectional view of the entire sheet being bent into a side rail of a box-shaped configuration with the marginal edges of the sheet in abutment and being continuously joined by a welding gun;

FIGURE 8 is a perspective view of a portion of the completed side rail after it has been removed from the bending rolls, welded along the seam, rotated 90°, and cut to length;

FIGURE 9 is an enlargement of a section of a corner portion of the completed side rail seen in FIGURE 8;

FIGURE 10 is a perspective view of a portion of a strip metal stock to which longitudinally extending segments have been joined at laterally spaced intervals. This figure depicts an alternate method for shaping the strip metal stock into a sheet replacing the step illustrated in FIGURE 1; and, FIGURE 11 is a completed side rail fabricated from a sheet formed by the method shown in FIGURE 10 and which has been bent to shape and welded similar to the steps illustrated in FIGURES 2 through 8.

In FIGURE 1 can be seen a continuous strip metal stock 11 of uniform thickness having longitudinally extending marginal edges 12. The stock 11 is being fed along a flat bed 13 of a rolling mill. The rolling mill is provided with pressure rolls 14 that, by cold forming, shape the flat metal strip stock 11 into a sheet 15 having two longitudinally extending portions 16 of a thickness heavier than the remaining portions of the sheet 15.

The rolls 14, in this instance, are arranged so that the rolled heavier portions 16 are equally spaced from the marginal edges 12 and so that a relatively thin end portion 17 extends inwardly from each marginal edge 12 and a relatively thin center portion 18 is disposed between the two heavier portions 16. The total width dimension of both end portions 17 is approximately equal to the width dimension of the center portion 18.

It is to be understood that the location of the heavier portions 16 with respect to the marginal edges 12 is optional as the longitudinally extending seam defined by the abutting edges 12 after the sheet 15 is bent to shape may be located at any line suitable for welding. The rolls 14 cold forming the sheet 15 may be axially aligned as shown in FIGURE 1 or sequentially positioned. The position and operation of the rolls 14 may be varied to suit the speed of rolling, the pressure applied, and the metallurgical composition of the strip metal stock 11 being fed through the rolling mill.

FIGURES 2 through 7 illustrate typical phases of the progressive bending operation of the sheet 15 after it has been rolled to the configuration shown in FIGURE 1. As both sides of the sheet 15 are symmetrical, only one-half is shown in FIGURES 2 through 4 and the other half of the sheet 15 is depicted in FIGURES 5 and 6 for illustrative purposes.

In FIGURE 2 one end portion 17 is shown being bent upwardly by several conventional bending rolls 19 in a direction extending transversely of the sheet 15. The bending rolls 19 are positioned on each side of the strip metal stock 11 so as to maintain constant contact with the sheet 15 as it is gradually and progressively bent to the shape desired. The phase of the bending operation illustrated in FIGURE 2 depicts the forming of a corner 21 in the heavier wall region near the junction of one end portion 17 and one of the two heavier portions 16.

In FIGURE 3 is seen a further phase of the progressive bending operation in which a plurality of bending rolls 22 are positioned so as to bend the sheet 15 at two points. A second corner 23 is being formed at the other end of the heavier portion 16 adjacent the juncture between one of the two heavier portions 16 and the center portion 18.

In FIGURES 4 through 6 are seen further phases of the progressive bending operation of the sheet 15 performed by the bending rolls 24, 25, 26, respectively, illustrating the gradual bending of the sheet 15 into a tubular member with the corners 21 and 23 lying in the heavier portions 16 thereof.

In FIGURE 7, the sheet 15 is being bent by bending rolls 27 into its final rectangular configuration until the marginal edges 12 of the sheet 15 are in abutment to form a side rail 28 having a hollow rectangular cross section. The abutting marginal edges 12 are continuously joined by a welding gun 29 disposed between the upper bending rolls 31. The bending rolls 27 and 31, which apply pressure to the side rail 28 so that it retains its bent shape, also convey the side rail 28 along a straight path to permit continuous seam welding of the abutting marginal edges 12.

The completed side rail 28 fabricated by the method of this invention is shown in FIGURE 8. It is cut to length by conventional cutting means (not shown) such as a flying shear, an abrasive cutter, or a saw. A trimming operation to clean the welded seam may be performed before the side rail is cut to length if desired.

The side rail 28 is shown rotated 90° after fabrication as the side rail is assembled into a frame with its thin wall sections disposed vertically and its heavy wall sections diposed horizontally.

It should be noted that the horizontally extending wall sections of the side rails are formed from the heavier portions 16 of the sheet 15. The heavier portions 16 extend into the upper and lowermost regions of the vertically disposed wall sections of the side rail 28. This assures that the corners 21 and 23 fall within the heavier wall regions as shown in the enlargement of corner 21 in FIGURE 9. For this reason, each heavier portion 16 of the sheet 15 before it is bent has to be of a greater width than each horizontally extending wall section of the completed side rail 28.

It can be readily seen from FIGURE 8 that the horizontally extending wall sections of the side rail 28 are of a heavier thickness than the vertically disposed wall sections. Thus, the horizontally extending wall sections can withstand any deflection the side rail 28 may be subjected to when installed as part of the motor vehicle chassis. Also, the vertically disposed wall sections of the side rail 28 are relatively thin but still provide sufficient strength to resist any stresses it may encounter.

In FIGURE 10 is seen an alternate method for fabricating a side rail 32 from a strip metal stock 33 without rolling the stock. Cold forming a strip metal stock to form a sheet of variable thickness may require a substantial investment for tooling. To reduce the cost of manufacturing, an alternate means to perform the first step of this invention has been devised. In this alternate embodiment, two separate longitudinally extending segments 34 of uniform cross section are first cut from conventional narrow metal stock. These segments 34 are then joined to one surface of the metal strip stock 33 at spaced intervals so as to effect a sheet 35 having alternating thin and heavy wall sections. These segments 34 may be joined to the surface of the metal strip stock 33 by spot or pressure welding. Alternately, a resin bonding agent is spread on one surface of each segment 34 and/or the surface of the strip metal stock 33 and then pressure is applied to the segments 34 to form a unitary sheet 35. The segments 34 may also be brazed to the surface of the strip metal stock 33.

The bond between the segments 34 and the strip metal stock 33 has to be strong enough to prevent the separation of the joined surfaces during the bending operation of the sheet 35 or when being subjected to stresses while being a part of the motor vehicle chassis.

The typical thickness dimension of the horizontally extending wall sections of the side rail fabricated by the method of this invention is .10 inch, while the vertically disposed wall sections usually do not exceed .05 inch in thickness. These thickness dimensions can be readily achieved by employing the method of this invention to the fabrication of automobile side rails. A substantial reduction in weight for each side rail can be effected without sacrificing any structural rigidity for the vehicle frame. The reduction in weight will result in a material cost saving and in an improvement of the performance of the motor vehicle.

The longitudinally extending welded seam joining the marginal edges of the side rail is depicted in the illustrated embodiments to be at the longitudinal center axis of one of the vertically disposed wall sections. This location of the seam is preferable as the vertically disposed wall sections of the side rail are subjected to less stress along this axis and thus welding failures are reduced. But it is to be understood that the welded seam may be readily located at the corners or in the heavier portions of the side rail if desired.

Also, it is to be understood that the described method of this invention for fabricating side rails may also be applied to the fabrication of structural members such as channels, angles, or tubular members of any size and shape for which it is desirable to embody wall sections of varying thickness.

It will be further understood that this invention is not to be limited to the exact construction shown and described but that various changes and modifications may be made without departing from the spirit and scope of the invention as defined in the appended claims.

I claim:

1. A method for fabricating an automobile side rail having a hollow rectangular cross section from a continuous planar strip metal stock, said strip metal stock having longitudinally extending margins, said method comprising the steps of rolling said strip metal stock so as to integrally form on one surface thereof two longitudinally extending portions of a thickness heavier than the remaining portions of said strip metal stock, said longitudinal portions of heavier thickness being laterally spaced from each other and from the marginal edges of said strip metal stock, each portion of heavier thickness being wider than one side of an automobile side rail, progressively bending said strip stock transversely until the longitudinal marginal edges of said strip stock are in abutment and with the portions of equal thickness being in a diametrically opposed relationship and the corners of said bent stock lying in the portions of heavier thickness, continuously welding the abutting marginal edges so as to effect a continuous box-shaped side rail, and then cutting said continuous side rail into automobile side rails of a predetermined length.

2. A method for fabricating an automobile side rail having a hollow rectangular cross section for a vehicle frame from a continuous planar strip metal stock, said strip metal stock having longitudinally extending margins, said method comprising the steps of rolling said strip metal stock so as to integrally form on one side thereof two longitudinally extending portions of a thickness greater than the remaining portions of said strip metal stock, said portions of heavier thickness being laterally spaced from each other and from the marginal edges of said strip metal stock, each portion of heavier thickness being wider than the width of each lateral side of the hollow rectangular cross sectional side rail having its longer sides disposed in a vertical plane, progressively bending said metal strip stock until the longitudinal marginal edges are in abutment and with the portions of equal thickness being in a diametrically opposed relationship and the inside corners of said bent stock being in the portions of heavier thickness, continuously welding said marginal edges of said strip metal stock so as to effect a continuous, rectangular cross sectional side rail, and cutting said continuous side rail into side rails of proper length for assembly into vehicle frames.

References Cited by the Examiner

UNITED STATES PATENTS

| | | | |
|---|---|---|---|
| 950,280 | 2/10 | Everson | 80—66 |
| 2,023,638 | 12/35 | Lawson | 153—21 X |
| 2,085,829 | 7/37 | Rogers | 29—155 |
| 2,172,806 | 9/39 | Probeek | 29—155 |
| 2,201,047 | 5/40 | Moore et al. | 29—155 X |
| 2,662,272 | 12/53 | Macomber | 29—155 |
| 2,695,445 | 11/54 | Johnson et al. | 29—417 |
| 3,101,272 | 8/63 | Sefzer | 29—155 |

WHITMORE A. WILTZ, *Primary Examiner.*

THOMAS H. EAGER, *Examiner.*